(12) United States Patent
Qiu

(10) Patent No.: US 10,295,430 B2
(45) Date of Patent: May 21, 2019

(54) ASSEMBLY FOR START-UP TESTING FLUID FLOW CONTROL DEVICES AT VARIOUS PRESSURES AND TEMPERATURES

(71) Applicant: FISHER CONTROLS INTERNATIONAL LLC, Marshalltown, IA (US)

(72) Inventor: Yan Qiu, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 230 days.

(21) Appl. No.: 15/344,164

(22) Filed: Nov. 4, 2016

(65) Prior Publication Data

US 2017/0122832 A1 May 4, 2017

Related U.S. Application Data

(60) Provisional application No. 62/251,097, filed on Nov. 4, 2015.

(51) Int. Cl.
*F16K 1/42* (2006.01)
*F16K 3/24* (2006.01)
(Continued)

(52) U.S. Cl.
CPC .............. *G01M 3/02* (2013.01); *F16J 15/00* (2013.01); *F16J 15/002* (2013.01); *F16K 1/42* (2013.01); *F16K 3/24* (2013.01); *F16K 3/246* (2013.01); *F16K 37/0066* (2013.01); *F16K 37/0083* (2013.01); *G01M 3/086* (2013.01); *G01M 3/144* (2013.01); *G01M 3/184* (2013.01); *G01M 3/224* (2013.01)

(58) Field of Classification Search
CPC ...... G01M 3/184; G01M 3/224; G01M 3/144; G01M 3/086; F16J 15/002; F16K 3/24; F16K 3/246
See application file for complete search history.

(56) References Cited

U.S. PATENT DOCUMENTS 4,706,970 A  11/1987  Ramirez
6,530,261 B1  3/2003  Foster
(Continued)

FOREIGN PATENT DOCUMENTS

EP   1 408 265 A1   4/2004
WO   WO-2015142977 A1   9/2015

OTHER PUBLICATIONS

Fisher® TBX Hydro-Plug Fixture, Instructional Manual, D103208X012—Oct. 2012.
(Continued)

*Primary Examiner* — Paul M. West
(74) *Attorney, Agent, or Firm* — Marshall, Gerstein & Borun LLP

(57) ABSTRACT

An assembly is provided for performing start-up testing on a fluid flow control device. The assembly includes a retainer adapted to be disposed in a valve body of the fluid flow control device, and a sealing assembly coupled to a portion of the retainer and adapted to be disposed adjacent a valve seat of the fluid flow control device. The sealing assembly includes one or more sealing elements configured to provide a seal during start-up testing at a service temperature of between approximately −325 degrees Fahrenheit and approximately 1250 degrees Fahrenheit.

25 Claims, 5 Drawing Sheets

(51) Int. Cl.
*G01M 3/02* (2006.01)
*G01M 3/08* (2006.01)
*G01M 3/14* (2006.01)
*G01M 3/18* (2006.01)
*G01M 3/22* (2006.01)
*F16J 15/00* (2006.01)
*F16K 37/00* (2006.01)

(56) References Cited

U.S. PATENT DOCUMENTS

| | | |
|---|---|---|
| 2004/0173005 A1 | 9/2004 | Martone et al. |
| 2012/0319027 A1 | 12/2012 | Dobbs et al. |
| 2014/0264135 A1 | 9/2014 | Bell |
| 2014/0264138 A1 | 9/2014 | Bell |

OTHER PUBLICATIONS

International Search Report and Written Opinion for PCT/US2016/060475, dated Feb. 22, 2017.

ASSEMBLY FOR START-UP TESTING FLUID FLOW CONTROL DEVICES AT VARIOUS PRESSURES AND TEMPERATURES

FIELD OF THE DISCLOSURE

The present disclosure generally relates to fluid flow control devices and, more particularly, to an assembly for use in performing start-up testing on fluid flow devices at various pressures and temperatures.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

To ensure that the quality of the end product is not affected, the various components of a process control system are tested during start-up, i.e., prior to being deployed for operation. For example, components such as control valves, pipelines, plumbing, gas tanks, and other pressure vessels are, prior to being deployed, typically subjected to hydrostatic testing whereby the component (e.g., the control valve, the pipeline) is filled with one or more liquids (e.g., water, oil) at room temperature (e.g., 70 degrees Fahrenheit), or another substantially similar temperature, to test the strength of the component and identify any leaks therein. In some cases, e.g., when those components are to be utilized in high-temperature environments and/or where high-pressure drops, it may also be desirable to subject these components to start-up testing using fluids, e.g., steam, at or having significantly higher temperatures (e.g., temperatures in excess of 100 degrees Fahrenheit, 200 degrees Fahrenheit, 500 degrees Fahrenheit, 1000 degrees Fahrenheit, or even 1200 or 1250 degrees Fahrenheit). In yet other cases, e.g., when those components are to be utilized in extremely low-temperature environments, it may be desirable to subject these components to start-up testing using fluids at or having very low temperatures (e.g., below 70 degrees Fahrenheit, below 32 degrees Fahrenheit, cryogenic temperatures). It may also be desirable to subject these components to extremely high pressures, extremely low pressures, other pressures, and/or significant pressure drops.

However, equipment that is conventionally used to perform hydrostatic testing often includes components, e.g., rubber or plastic seals, that are not built to withstand higher temperatures, high pressure drops, and/or extremely low temperatures, such that the equipment is not operable across the whole range of temperatures and/or pressures needed to properly test the process control system component prior to operation (i.e., properly start-up test the process control system component).

FIG. 1 illustrates an example of such a conventional device, in the form of a fixture 100, which can be used to perform hydrostatic testing on a control valve 104 having a valve body 108 and a valve seat 112 disposed in the valve body 108. The fixture 100, which when employed replaces the valve plug and the valve cage of the control valve 104, includes a plug 116 and a rubber or plastic o-ring 120 arranged at one end 124 of the plug 116. The plug 116 is disposed in the valve body 108 such that a portion of the plug 116 and the o-ring 120 engage the valve seat 112. When arranged in this manner, an end user of the control valve 104 may perform hydrostatic testing on the control valve 104 and any other pressure vessels within the process control system using fluids at room temperature (e.g., 70 degrees Fahrenheit) or other similar temperatures (e.g., temperatures between 32 degrees Fahrenheit and 100 degrees Fahrenheit). But, because the o-ring 120 is made of plastic or rubber, which may extrude, disintegrate, or otherwise fail in response to temperatures in excess of 450 degrees Fahrenheit, cryogenic temperatures, high pressures, and high pressure drops, for example, the fixture 100 cannot be used for start-up testing on the control valve 104 using fluids (e.g., steam) at or having such temperatures and/or when subjected to high pressures and/or high pressure drops. As a result, the fixture 100 must be removed and different equipment used, and/or different tests employed to properly test the control valve 104, prior to operation, at such different temperatures.

SUMMARY

In accordance with a first exemplary aspect, an assembly is provided for performing start-up testing on a fluid flow control device having a valve body defining an inlet, an outlet, and a fluid flow path extending between the inlet and the outlet, and valve seat disposed within the valve body and defining an orifice through which the fluid flow path passes. The assembly includes a retainer adapted to be disposed in the valve body, and a sealing assembly coupled to a portion of the retainer and adapted to be disposed adjacent the valve seat. The sealing assembly includes one or more sealing elements configured to provide a seal during start-up testing at a service temperature of between approximately −325 degrees Fahrenheit and approximately 1250 degrees Fahrenheit.

In accordance with a second exemplary aspect, a fluid flow control device is provided that includes a valve body defining an inlet, an outlet, and a fluid flow path extending between the inlet and the outlet, a valve seat disposed within the valve body and defining an orifice through which the fluid flow path passes, and an assembly configured to be removably coupled to the fluid flow control device for performing start-up testing on the fluid flow control device. The assembly includes a retainer adapted to be disposed in the valve body, and a sealing assembly coupled to a portion of the retainer and adapted to be disposed adjacent the valve seat. The sealing assembly includes one or more sealing elements configured to provide a seal during start-up testing at a service temperature of between approximately −325 degrees Fahrenheit and approximately 1250 degrees Fahrenheit.

In accordance with a third exemplary aspect, a method of start-up testing a fluid flow control device is provided. The fluid flow control device has a valve body defining an inlet, an outlet, and a fluid flow path extending between the inlet and the outlet, and a valve seat disposed within the valve body and defining an orifice through which the fluid flow path passes. The method includes: (1) coupling an assembly to the fluid flow control device, the assembly includes a retainer coupled to a portion of the valve body and a sealing assembly coupled to a portion of the retainer, the sealing assembly comprising one or more sealing elements; (2) performing, when the assembly is coupled to the fluid flow control device, a first portion of the start-up testing at a service temperature of between approximately 0 degrees Fahrenheit and approximately 200 degrees Fahrenheit; (3) performing, when the assembly is coupled to the fluid flow control device, a second portion of the hydrostatic testing at a service temperature of one of (i) between approximately 450 degrees Fahrenheit and approximately 1250 degrees Fahrenheit and (ii) between −325 degrees Fahrenheit and approximately −100 degrees Fahrenheit, the second portion being performed subsequent to the first portion; and (4) removing the assembly from the fluid flow control device.

In further accordance with any one or more of the foregoing first, second, or third exemplary aspects, an assembly, a fluid flow control device, or a method of start-up testing may include any one or more of the following further preferred forms.

In one preferred form, the sealing assembly is threaded to the retainer proximate to an end of the retainer.

In another preferred form, the sealing assembly is arranged to effectuate a single or bi-directional seal during the hydrostatic testing.

In another preferred form, the sealing assembly includes a first sealing element, a second sealing element, and a spacer disposed between the first and second sealing elements.

In another preferred form, the first and second sealing elements are arranged to effectuate a bi-directional seal during the hydrostatic testing.

In another preferred form, the first sealing element includes a first C-seal and the second sealing element includes a second C-seal.

In another preferred form, the first sealing element faces a first direction and the second sealing element faces a second direction opposite the first direction.

In another preferred form, a mouth of the first sealing element faces the first direction and a mouth of the second sealing element faces the second direction.

In another preferred form, the mouth of each of the first and second sealing elements faces the spacer.

In another preferred form, the mouth of the first sealing element is aligned with the mouth of the second sealing element along a common longitudinal axis.

In another preferred form, the spacer comprises one or more holes configured to facilitate pressure flow toward the first sealing element and/or the second sealing element during the start-up testing.

In another preferred form, the spacer is disposed in contact with each of the first and second sealing elements.

In another preferred form, the mouth of the first sealing element is aligned with the mouth of the second sealing element along a longitudinal axis of the retainer.

DETAILED DESCRIPTION

The present disclosure is directed to an assembly for use in testing a fluid flow control device over a wide range of temperatures and pressures prior to operation of the fluid flow control device. The assembly can, on one hand, be used to perform hydrostatic testing on the fluid flow control device using one or more liquids (e.g., water, oil) at room temperature (i.e., approximately 70 degrees Fahrenheit). At the same time, the assembly 200 can be used to perform start-up testing on the fluid flow control device using one or more fluids (e.g., steam, liquids) at or having higher temperatures (e.g., temperatures in excess of 70 degrees Fahrenheit, temperatures in excess of 450 degrees Fahrenheit, temperatures in excess of 1000 degrees Fahrenheit), at or having extremely low temperatures (e.g., temperatures below 32 degrees Fahrenheit, temperatures below 0 degrees Fahrenheit, cryogenic temperatures), and/or subject to high pressures and significant pressure drops.

Figure 1:
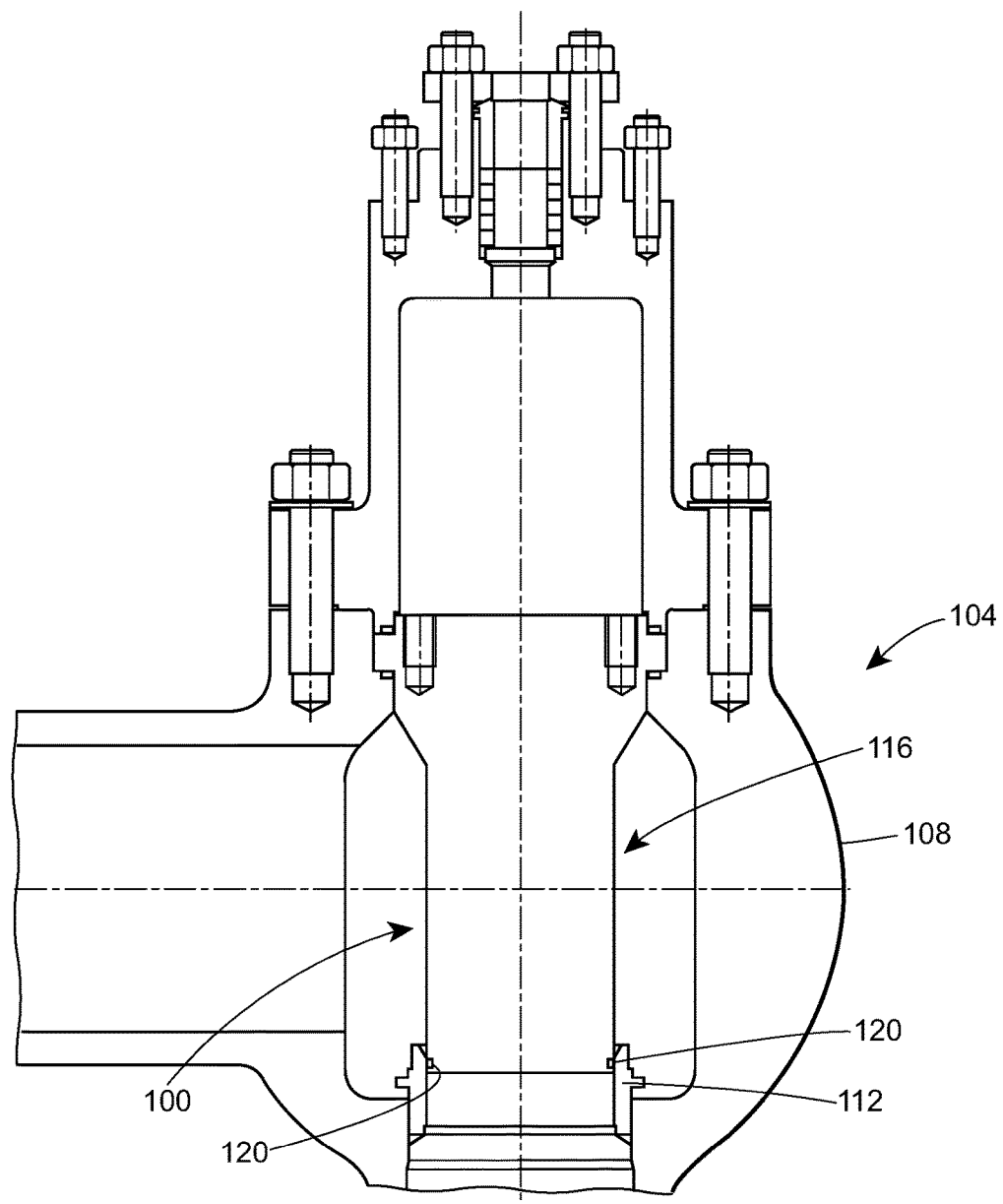
FIG. 1 is a cross-sectional view of a conventional fixture used to perform hydrostatic testing on a control valve.
Figure 2:
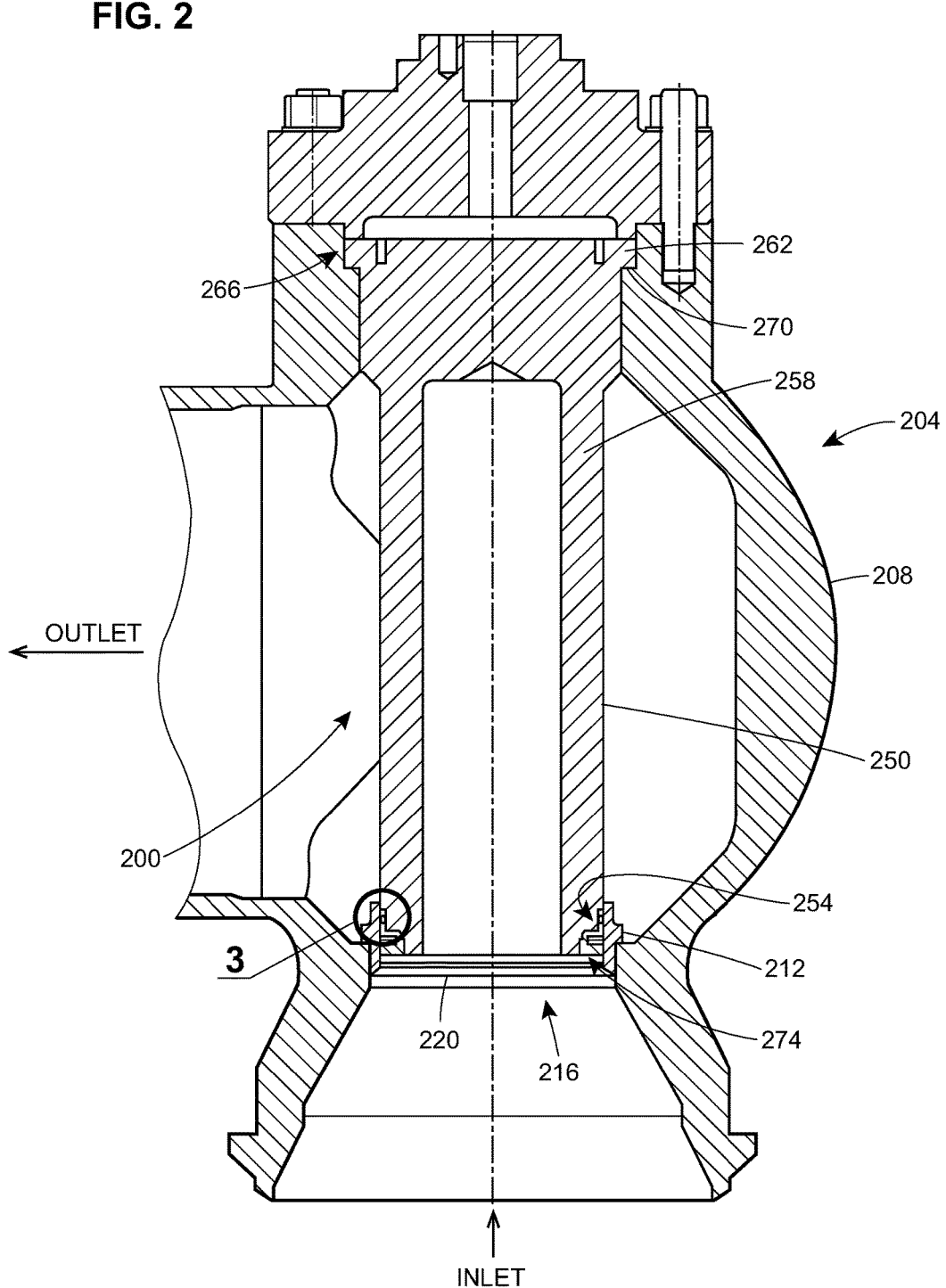
FIG. 2 is a cross-sectional view of an assembly constructed in accordance with the teachings of an example of the present invention and utilized in combination with a first example of a fluid flow control device to perform testing of the fluid flow control device at various temperatures and pressures.

FIG. 2 illustrates one example of an assembly 200 constructed in accordance with the principles of the present disclosure. In FIG. 2, the assembly 200 is coupled to a fluid flow control device 204, which in this example takes the form of a sliding-stem type control valve (e.g., a TBX Steam Conditioning Valve, manufactured by Emerson Process Management), for start-up testing on the fluid flow control device 204. In other examples, the assembly 200 can alternatively be employed in connection with a different type of sliding-stem type control valve (e.g., a CVX Steam Conditioning Valve, also manufactured by Emerson Process Management), a different type of control valve (e.g., a rotary control valve, an isolation valve, etc.) or a wholly different type of fluid flow control device. It will also be appreciated that it is conceivable that the assembly 200 can instead be used to perform testing of the fluid flow control device 204 after start-up, i.e., after initial operation, at, e.g., a regularly scheduled testing interval.

As illustrated in FIG. 2, the control valve 204 includes a valve body 208 and a valve seat 212 disposed in the valve body 208. While only partially visible in FIG. 2, the valve body 208 defines an inlet port, an outlet port, and a fluid flow path 216 extending between the inlet port and the outlet port. The valve seat 212 in this example takes the form of an annular seat ring welded to a portion of the body 208, though it will be appreciated that the valve seat can take other forms and/or can be threaded, bolted, clamped, or otherwise secured to the body 208. The valve seat 212 defines an orifice 220 through which the fluid flow path 216 passes (and through which fluid flow passes when the valve 204 is operational). As in this example the assembly 200 is being used to perform start-up testing on the fluid flow control device 204, the fluid flow control device 204 illustrated in FIG. 2 does not include a valve cage, a valve plug, or a valve stem; instead these components (and any other desired components, e.g., an actuator, a diffuser) are coupled to the fluid flow control device 204 following the completion of start-up testing and following the removal of the assembly 200 from the device 204.

Figure 3:
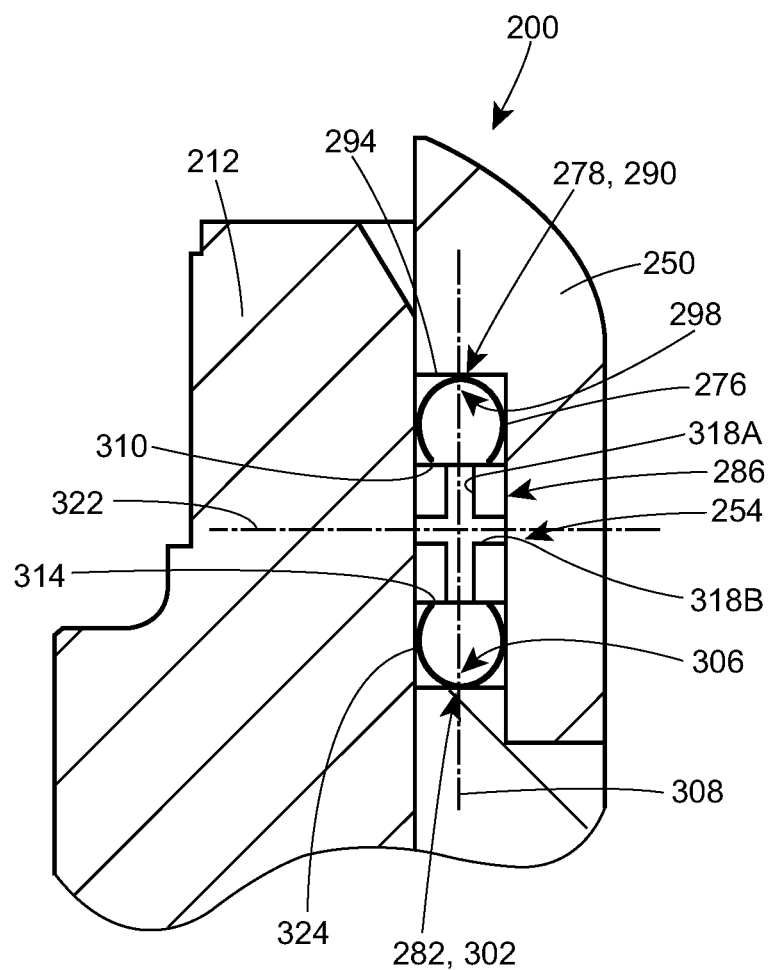
FIG. 3 is an enlarged, partial cross-sectional view of a bottom-left portion of FIG. 2.

As illustrated in FIGS. 2 and 3, the assembly 200 includes a retainer 250 and a sealing assembly 254 coupled to a portion of, and retained in place by, the retainer 250. The retainer 250 has a substantially annular body 258 and an outwardly extending annular flange 262 at a first end 266 of the retainer 250. The flange 262 is disposed or seated on an annular shoulder 270 of the valve body 208, with the substantially annular body 258 extending or hanging downwardly (at least when viewed in FIG. 2) into an interior of the valve body 208, such that a second end 274 of the retainer 250, which is opposite the first end 266, is disposed immediately adjacent the valve seat 212. The sealing assembly 254 is generally coupled to the retainer 250 at a position proximate to the second end 274 of the retainer 250. More specifically, the sealing assembly 254 is threaded to an exterior surface 276 of the retainer 250 via a recess or gland defined or formed in the retainer 250 proximate to the second end 274 of the retainer 250. Because the second end 274 of the retainer 250 is disposed immediately adjacent the valve seat 212, the sealing assembly 254 is also disposed immediately adjacent the valve seat 212, as illustrated in FIGS. 2 and 3.

With reference now to FIG. 3, the sealing assembly 254 includes a first sealing element 278, a second sealing element 282, and a spacer 286 disposed between the first and second sealing elements 278, 282. The first sealing element 278 takes the form of a C-seal 290 made of a corrosion-resistant metal, such as, for example N07718 (Inconel 718), capable of withstanding a wide range of temperatures and pressures. The C-seal 290 is threaded to the exterior surface 276 of the retainer 250 proximate to a shoulder portion 294 of the retainer 250, with a mouth 298 of the C-seal 290 facing a first direction (in this case, downwardly toward the inlet port). The second sealing element 282 takes the form of a C-seal 302 that is also made of a corrosion-resistant metal, such as, for example, N07718 (Inconel 718), capable of withstanding a wide range of temperatures and pressures. The C-seal 302 is, like the C-seal 290, threaded to the exterior surface 276 of the retainer 250, but is threaded to the retainer 250 such that a mouth 306 of the C-seal 302 faces a second direction opposite the first direction (in this case, upwardly toward the first end 266 of the retainer 250)c. In other words, the C-seals 290, 302 are, at least in this example, oriented in opposite directions. The C-seals 290, 302 are, however, aligned with one another along a common longitudinal axis 308.

The spacer 286 has a top surface 310 disposed immediately adjacent (e.g., in contact with) the C-seal 290 and a bottom surface 314 opposite the top surface 310 and disposed immediately adjacent (e.g., in contact with) the C-seal 302. The spacer 286 also includes one or more holes drilled or otherwise formed therethrough to route pressure to the C-seal 290 and/or the C-seal 302 so as to assist in sealing. In this example, the spacer 286 includes a pair of holes 318A, 318B arranged to facilitate balanced pressure distribution amongst or between the C-seal 290 and the C-seal 302. The hole 318A extends along the longitudinal axis 308, while the other hole 318B extends along a transverse axis 322 oriented perpendicular to the longitudinal axis 308.

It will be appreciated that the retainer 250 can vary in shape, size, and/or construction, and/or can be coupled to the valve body 208 in a different manner. For example, the retainer 250 can be threaded, bolted, or otherwise secured to the valve body 208 in addition, or as an alternative, to the flange 262 being disposed or seated on the shoulder 270 of the valve body. The sealing assembly 254 can also or alternatively vary in shape, size, and/or construction, and/or can be coupled to the retainer 250 in a different manner. As an example, the first and/or second sealing elements 278, 282 can take the form of an E-shaped seal ring, a U-shaped seal ring, and/or some differently shaped metal seal ring. As another example, the sealing assembly 254 may include more than two sealing elements. As a further example, e.g., when only single direction shutoff is required, the sealing assembly 254 may only include one sealing element (the first or second sealing element 278, 282); in such a case, the assembly 200 may or may not include the spacer 286, and if it does, the spacer 286 may or may not include the holes 318A and/or 318B.

In any event, when the sealing assembly 254 is coupled to the retainer 250 and the retainer 250 is coupled to the valve body 208, the elements of the sealing assembly 254—the first sealing element 278, the second sealing element 282, and the spacer 286—are disposed between the exterior portion 276 of the retainer 250 and a radially inwardly extending surface 324 of the valve seat 212. So arranged, when start-up testing is performed on the control valve 204, and fluid and/or pressure flows into the control valve 204 via the inlet port or the outlet port, the sealing assembly 254 provides a bi-directional seal that prevents upstream and downstream fluid and pressure. Beneficially, as discussed above, the sealing assembly 254 provides such a seal across the wide range of temperatures and pressures needed to properly test the control valve 204 prior to operation. More specifically, the sealing assembly 254 provides such a seal when start-up testing is performed using fluids at or having a wide range of temperatures, including extremely low temperatures (e.g., cryogenic temperatures), extremely high temperatures (e.g., temperatures above 450 degrees Fahrenheit, temperatures above 1000 degrees Fahrenheit, temperatures above 1200 or 1250 degrees Fahrenheit, other temperatures (e.g., temperatures therebetween), and subject to a wide range of pressures, including very low pressures, very high pressures, and large pressure changes or drops. The same sealing assembly 254 can thus be used when performing start-up testing on the control valve 204, thereby eliminating the need for additional equipment.

As briefly discussed above, when the end-user of the control valve 204 has completed start-up testing, the assembly 200 can be easily and quickly removed from the valve body 208 of the control valve 204. In turn, a valve cage, a valve plug, and a valve stem, as well as any other desired components, can be installed within the control valve 204. Once installed, those components would operate in a known manner, so further details are not discussed herein.

Finally, while the sealing assembly 254 is implemented in connection with the assembly 200 for the purpose of performing start-up testing on the control valve 204, it will be appreciated that the sealing assembly 254 can be incorporated into a valve cage or a valve plug of the control valve 204 for the purpose of effectuating a bi-directional seal, when the control valve 204 is operational, over a full temperature range of between approximately −325 degrees Fahrenheit and approximately 1100 degrees Fahrenheit.

Figure 4:
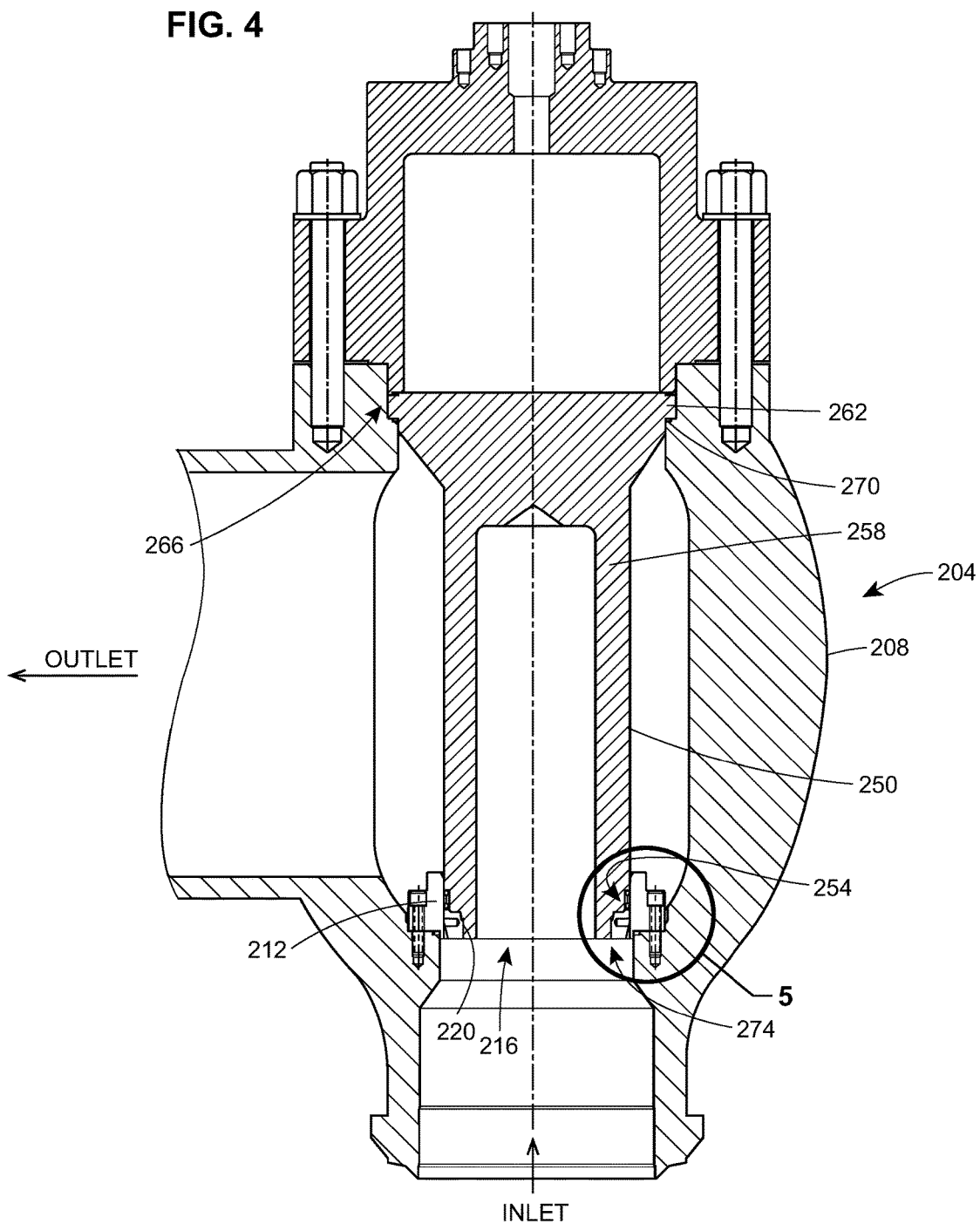
FIG. 4 is a cross-sectional view of the assembly of FIGS. 2 and 3 but utilized in combination with a second example of a fluid flow control device to perform testing of the fluid flow control device at various temperatures and pressures.
Figure 5:
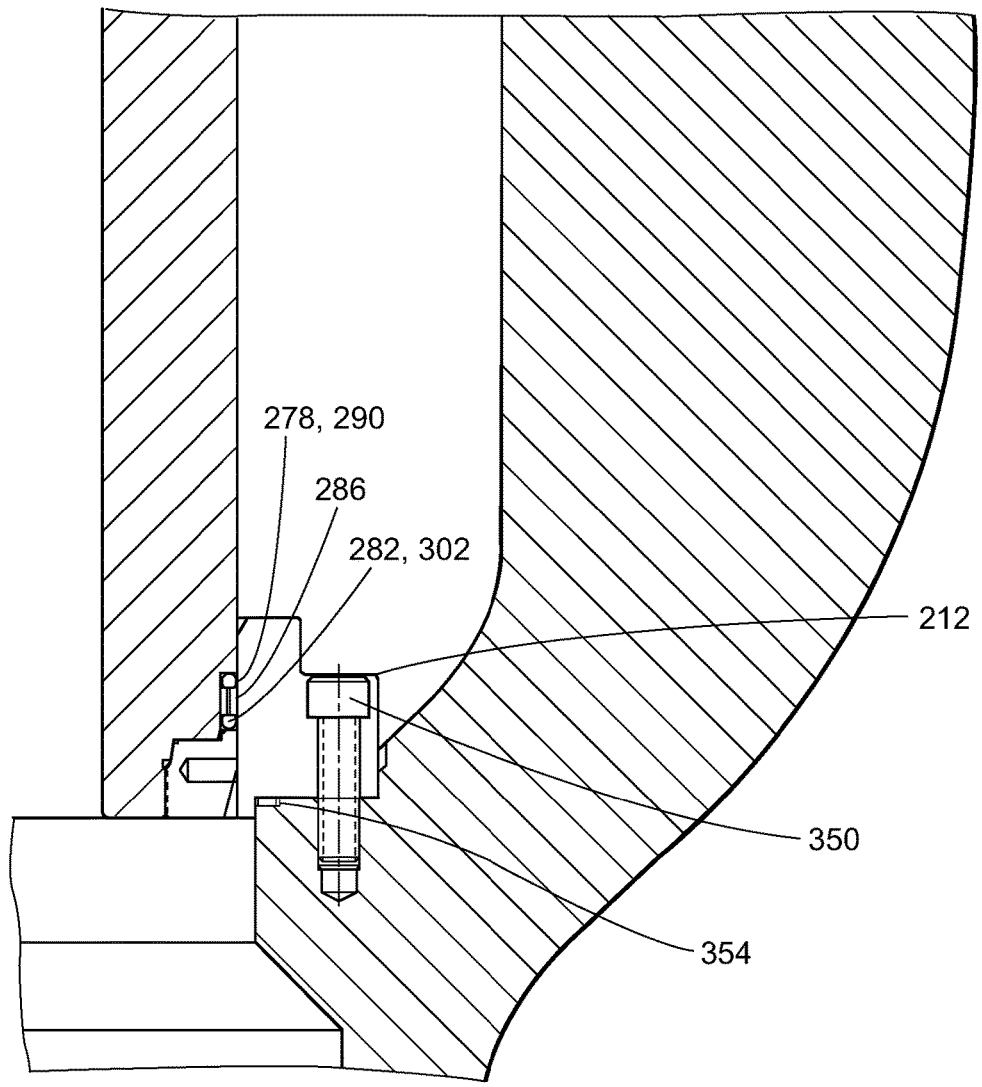
FIG. 5 is an enlarged, partial cross-sectional view of a bottom-left portion of FIG. 4.

FIGS. 4 and 5 depict the assembly 200 coupled to a fluid flow control device 204 that is substantially similar to, but slightly different than, the fluid flow control device of FIGS. 2 and 3, with common reference numerals used to depict common components. Unlike the fluid flow control device 204 of FIGS. 2 and 3, wherein the seat ring 212 is welded to the body 208, in the fluid flow control device 204 shown in FIGS. 4 and 5, the seat ring 212 is bolted to the body 208 using a plurality of screws 350. Accordingly, a sealing element 354, which in this example takes the form of an annular gasket, is arranged between opposing surfaces of the valve body 208 and the seat ring 212 so as to effectuate a seal therebetween.

The invention claimed is:

1. An assembly for performing start-up testing on a fluid flow control device having a valve body defining an inlet, an outlet, and a fluid flow path extending between the inlet and the outlet, and valve seat disposed within the valve body and defining an orifice through which the fluid flow path passes, the assembly comprising:
   a retainer adapted to be disposed in the valve body; and
   a sealing assembly coupled to a portion of the retainer and adapted to be disposed adjacent the valve seat, the sealing assembly comprising one or more sealing elements configured to provide a seal during start-up testing at any service temperature of between approximately −325 degrees Fahrenheit and approximately 1250 degrees Fahrenheit.

2. The assembly of claim 1, wherein the sealing assembly is threaded to the retainer proximate to an end of the retainer.

3. The assembly of claim 1, wherein the sealing assembly comprises a first sealing element, a second sealing element, and a spacer disposed between the first and second sealing elements.

4. The assembly of claim 3, wherein the first and second sealing elements are arranged to effectuate a bi-directional seal during the start-up testing.

5. The assembly of claim 3, wherein the first sealing element comprises a first C-seal and the second sealing element comprises a second C-seal.

6. The assembly of claim 3, wherein the first sealing element faces a first direction and the second sealing element faces a second direction opposite the first direction.

7. The assembly of claim 6, wherein a mouth of the first sealing element faces the first direction and a mouth of the second sealing element faces the second direction.

8. The assembly of claim 7, wherein the mouth of each of the first and second sealing elements faces the spacer.

9. The assembly of claim 7, wherein the mouth of the first sealing element is aligned with the mouth of the second sealing element along a common longitudinal axis.

10. The assembly of claim 3, wherein the spacer comprises one or more holes configured to facilitate pressure flow toward the first sealing element and/or the second sealing element during the start-up testing.

11. The assembly of claim 3, wherein the spacer is disposed in contact with each of the first and second sealing elements.

12. A fluid flow control device, comprising:
   a valve body defining an inlet, an outlet, and a fluid flow path extending between the inlet and the outlet;
   a valve seat disposed within the valve body and defining an orifice through which the fluid flow path passes; and
   an assembly configured to be removably coupled to the fluid flow control device for performing start-up testing on the fluid flow control device, the assembly comprising:
   a retainer adapted to be disposed in the valve body; and
   a sealing assembly coupled to a portion of the retainer and adapted to be disposed adjacent the valve seat, the sealing assembly comprising one or more sealing elements configured to provide a seal during start-up testing at any service temperature of between approximately −325 degrees Fahrenheit and approximately 1250 degrees Fahrenheit.

13. The fluid flow control device of claim 12, wherein the sealing assembly is threaded to the retainer proximate to an end of the retainer.

14. The fluid flow control device of claim 12, wherein the sealing assembly comprises a first sealing element, a second sealing element, and a spacer disposed between the first and second sealing elements.

15. The fluid flow control device of claim 14, wherein the first and second sealing elements are arranged to effectuate a bi-directional seal during the start-up testing.

16. The fluid flow control device of claim 14, wherein the first sealing element comprises a first C-seal and the second sealing element comprises a second C-seal.

17. The fluid flow control device of claim 14, wherein the first sealing element faces a first direction and the second sealing element faces a second direction opposite from the first direction.

18. The fluid flow control device of claim 17, wherein a mouth of the first sealing element faces the first direction and a mouth of the second sealing element faces the second direction.

19. The fluid flow control device of claim 18, wherein the mouth of each of the first and second sealing elements faces the spacer.

20. The fluid flow control device of claim 18, wherein the mouth of the first sealing element is aligned with the mouth of the second sealing element along a longitudinal axis of the retainer.

21. The fluid flow control device of claim 14, wherein the spacer comprises one or more holes configured to facilitate pressure flow toward the first sealing element and/or the second sealing element during the start-up testing.

22. The fluid flow control device of claim 14, wherein the spacer is disposed in contact with each of the first and second sealing elements.

23. The fluid flow control device of claim 12, further comprising a valve trim assembly configured to be removably coupled to the fluid flow control device following performance of the start-up testing on the fluid flow control device, the valve trim assembly comprising a valve cage, a valve plug movably disposed in the valve cage, and a valve stem coupled to the valve plug for controlling movement of the valve plug.

24. A method of start-up testing a fluid flow control device having a valve body defining an inlet, an outlet, and a fluid flow path extending between the inlet and the outlet, and a valve seat disposed within the valve body and defining an orifice through which the fluid flow path passes, the method comprising:
   coupling an assembly to the fluid flow control device, the assembly comprising a retainer coupled to a portion of the valve body and a sealing assembly coupled to a portion of the retainer, the sealing assembly comprising one or more sealing elements;
   performing, when the assembly is coupled to the fluid flow control device, a first portion of the start-up testing at a service temperature of between approximately 0 degrees Fahrenheit and approximately 200 degrees Fahrenheit;
   performing, when the assembly is coupled to the fluid flow control device, a second portion of the start-up testing at a service temperature of one of (i) between approximately 450 degrees Fahrenheit and approximately 1250 degrees Fahrenheit and (ii) between −325 degrees Fahrenheit and approximately −100 degrees Fahrenheit, the second portion being performed subsequent to the first portion; and then removing the assembly from the fluid flow control device.

25. The method of claim 24, wherein the sealing assembly comprises a first sealing element, a second sealing element, and a spacer disposed between the first and second sealing elements.

* * * * *